Jan. 9, 1951  J. E. McCLARY  2,537,148
PROCESS FOR THE PRODUCTION OF
RIBOFLAVIN BY FERMENTATION
Filed Feb. 16, 1948

INVENTOR:
Joseph E. McClary
Carr & Carr & Gravely
HIS ATTORNEYS.

UNITED STATES PATENT OFFICE 2,537,148

PROCESS FOR THE PRODUCTION OF RIBOFLAVIN BY FERMENTATION

Joseph E. McClary, Clayton, Mo., assignor to Anheuser-Busch, Inc., St. Louis, Mo., a corporation of Missouri Application February 16, 1948, Serial No. 8,514

13 Claims. (Cl. 195—92)

This invention relates to the production of water-soluble vitamins by fermentation, particularly to the production of riboflavin or vitamin $B_2$, the fermentation being brought about by a heretofore unrecognized plant which has now been named *Mycocandida riboflavina* (C. W. Dodge, Ann. Mo. Bot. Gardens 34: 31–36).

The objects of this invention are, therefore, to provide a process for the production of water-soluble vitamins (particularly riboflavin) in which the yield of vitamin is great enough to justify its operation for the production of vitamins alone, to produce these vitamins (particularly riboflavin) in a mash or medium which is inexpensive, and to use a member of the plant kingdom which may be separated from the mash or medium for the purpose of utilizing its high food value. Another object of this invention is to conduct the fermentation process under conditions especially favorable for the synthesis of riboflavin and the concentration of the vitamin in the fermenting medium so that the cost of production and recovery is greatly reduced. Still another object is that of recovering the vitamins from the process hereinafter disclosed.

During the examination of various stock cultures of yeasts with reference to the production of riboflavin in inexpensive media it was discovered that a culture originally isolated from figs produced slightly more vitamin $B_2$ than the average yeast or yeast-like culture. This culture showed considerable variation in its morphology and vitamin production when grown in inexpensive mashes. The culture was plated on agar media and selections were made of isolated colonies, which were transferred to liquid media in order to determine the morphology and riboflavin-producing capacity of the resulting cultures, and to arrange them in clones according to morphology and vitamin production. The highest yielding clones were again plated, individual colonies selected and transfers made to liquid media. This process was repeated until cultures developed which had the appearance shown in Figures 1, 2, 3 and 4 and the morphological and physiological characteristic hereinafter set forth.

The liquid media used for the progressive segregation of the different forms and the gradual development of the function of high vitamin or riboflavin production consisted of:

| | | |
|---|---|---|
| Glucose (cerelose) | gm. per liter | 50 |
| Corn steep water solids | do | 5 |
| Ammonium sulfate | do | 2 |
| pH adjusted to | | 4.5 to 5.0 |

For the purpose of isolating colonies from plates, 1.5% agar was added to the above media and the pH adjusted to 5.5 to 6.0.

Figure 1 shows the variation in colonies. Colony S is smooth, dense and pulvinate. Colony R is of the type usually described as "rough." Colony N is "normal" with reference to the production of high yields of riboflavin. The N colonies are smooth, less dense than the convex S colonies, and show a distinct convex center or umbonate structure, which may become umbilicate in old colonies.

Figure 1:
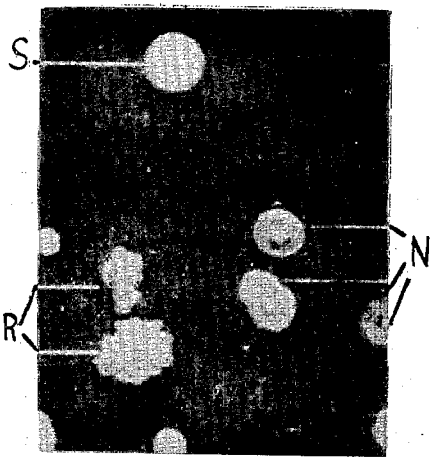
Figure 2:
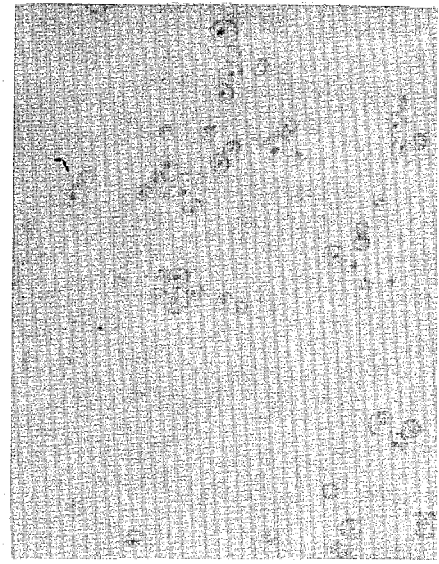
Figure 2 shows the morphology of cells of the S type colony.
Figure 3:
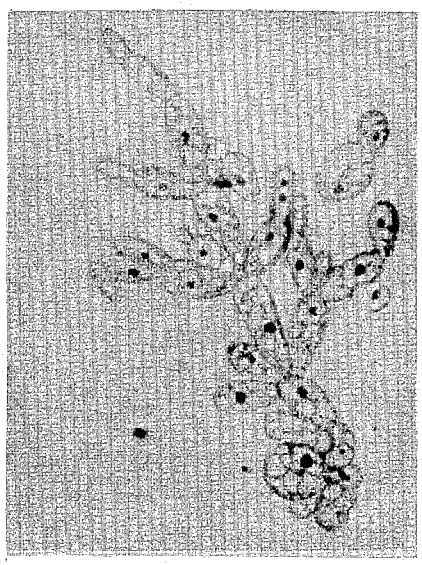
Figure 3 shows the morphology of cells of the R type colony.
Figure 4:
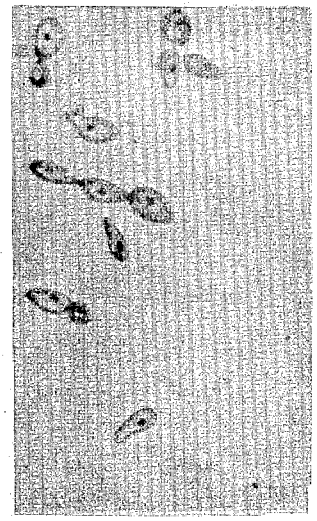
Figure 4 shows the morphology of cells of the N type colony.

The development of high vitamin producing forms and the adaptation of the original culture to economical nutrient mashes or media was attended by wide variation in the morphology and physiology of the resultant cultures. Therefore, the name *Mycocandida riboflavina* is generic in the sense that its applies to the high riboflavin producing "N" cultures as well as being connotative of varietal or mutant forms such as the "R" and "S" forms. A more detailed morphological and physiological description follows.

*Source.*—Parent stock culture derived from figs.

*Name.*—*Mycocandida riboflavina.*

*Development.*—Repeated selection from clones showing progressive development of high riboflavin production.

I. MORPHOLOGY

Media used:

| | | |
|---|---|---|
| Glucose | gm. per liter | 50 |
| Corn steep water solids | do | 2 |
| Ammonium sulfate | do | 2 |
| pH adjusted to | | 4.5 to 5.0 |

(a) "N" type culture

*Form.*—Acuminate to apiculate. Or, obtuse base with acuminate to apiculate tip. Or, spherical to oval.

*Size.*—2 to 3 by 3 to 5 microns.

(b) "R" type culture

*Form.*—Cells variable in form with tendency to form multiple buds and pseudomycelium in quiescent liquid cultures and on solid media.

*Size of cells.*—1.5 to 3 by 4 to 7 microns.

(c) "S" type culture

*Form.*—Spherical or slightly oval.

*Size.*—2.5 to 3 by 3 to 4 microns.

II. CULTURAL FEATURES

*Media used.*—Same as above fluid media plus 1.5% agar; pH 5.5 to 6.0.

(a) "N" type culture

Agar plates:
*Form of colony.*—Umbonate. May become umbilicate in old colonies.
*Topography.*—Smooth to minute pitting and slightly contoured.
*Luster.*—Dull.
*Margin.*—Entire.
*Color.*—White to straw color.
*Odor.*—Pleasant (odor of esters of organic acids).
*Agar stab.*—Growth limited almost entirely to surface. Filiform, along stab.
Liquid media:
*Media used.*—Above corn steep water, glucose, ammonium sulfate media.
*Surface growth.*—None or very slight. Surface growth may show "R" type.
*Sediment.*—Compact to granular.
*Turbidity.*—None.
*Color.*—Straw color to deep yellow.

(b) "R" type culture

Agar plates:
*Form of colony.*—Raised.
*Topography.*—Smooth to rugose.
*Luster.*—Dull to cretaceous.
*Color.*—White or greyish to straw color.
*Odor.*—Pleasant. Odor of esters.
*Agar stab.*—Growth irregular and limited almost entirely to surface. Filiform, along stab.
Liquid media:
*Surface growth.*—Thin scum. Pseudomycelium may appear in quiescent cultures.
*Sediment.*—Compact to granular.
*Turbidity.*—None.
*Color.*—Straw color to yellow.

(c) "S" type culture

Agar plates:
*Form of colony.*—Pulvinate to capitate.
*Topography.*—Smooth.
*Luster.*—Glistening.
*Color.*—White to straw color.
*Odor.*—Pleasant.
*Agar stab.*—Covers surface around stab with smooth, dense, glistening colony. Linear growth along stab.
Liquid media:
*Surface growth.*—None, or very rarely in case of reversion to another type.
*Sediment.*—Compact.
*Turbidity.*—None.
*Color.*—Straw color.

III. PHYSICAL AND BIOCHEMICAL FEATURES

*Sugars fermented with gas evolution*

| Sugar | Culture | | |
|---|---|---|---|
| | N | R | S |
| Glucose | + | + | + |
| Levulose | + | + | + |
| Mannose | + | + | + |
| Sucrose | + | + | + |
| Raffinose | + | + | + |
| Galactose | − | − | − |
| Lactose | − | − | − |
| Maltose | − | − | − |
| Melibiose | − | − | − |

*Utilization of sugars by "N" type*

| Sugar | For riboflavin synthesis | For growth |
|---|---|---|
| Arabinose | + | ++ |
| Glucose | +++ | ++ |
| Levulose | +++ | ++ |
| Maltose | − | − |
| Mannose | +++ | ++ |
| Melibiose | − | − |
| Raffinose | + | + |
| Ribose | + | ++ |
| Sucrose | +++ | ++ |
| Xylose | +++ | ++ |

| | Culture | | |
|---|---|---|---|
| | N | R | S |
| Production of alcohol | + poor | + poor | + poor |

| | N | R | S |
|---|---|---|---|
| Production of vitamins: | | | |
| Riboflavin | +++ | ++ | ++ |
| Thiamin | + | + | + |
| Pyridoxine | + | + | + |
| Folic Acid | + | + | + |
| Nicotinic Acid | + | + | + |

| | N | R | S |
|---|---|---|---|
| Relation to reaction of medium: | | | |
| Limits of pH— | | | |
| For growth | 2–7 | 2–7 | 2–7 |
| Vitamin production | 2–7 | 2–7 | 2–7 |
| Optimum pH— | | | |
| For growth | 3–6 | 3–6 | 3–6 |
| Vitamin production | 2–6 | 2–6 | 2–6 |

| | N | R | S |
|---|---|---|---|
| Relation to Oxygen: | | | |
| Aerobic growth | + | + | + |
| Anaerobic growth | poor | poor | poor |

As a source of nitrogen one may employ the compounds usually used for the cultivation of micro-organisms, such as ammonium salts, amino acids, petptones, etc. It will be understood that the features presented above represent average values and that in a culture which is as subject to variation or transmutation as are the cultures herein described it is necessary to make allowance for the presence of variable forms which may arise in any particular culture during its development. In general, the greatest amount of vitamin is produced by the "N" type culture, that of the "R" type is intermediate, while the "S" type produces the least amount or none.

The following examples illustrate nutrients which may be employed and yields of vitamins obtainable under the cultural condition indicated.

EXAMPLE 1

A medium was prepared consisting of:

| | | |
|---|---|---|
| Glucose (cerelose) | gm | 50.00 |
| Potassium phosphate, monobasic | gm | 1.00 |
| Magnesium sulfate (7 H2O) | gm | 0.50 |
| Fumaric acid | gm | 1.32 |
| Sodium carbonate | gm | 1.15 |
| Yeast extract (Difco) | gm | 0.50 |
| Asparagin | gm | 2.00 |
| Water | cc | 1000.00 |

Twenty-five cubic centimeter portions were placed in flasks and sterilized at 15 lbs. pressure for 20 minutes. After cooling, the flasks were inoculated with a suspension of *Mycocandida riboflavina* and incubated at 30° C. After 7 days analyses were made for riboflavin, the yield ranging from 7 to 10 micrograms per milliliter of medium.

Under the same conditions except that corn steep water solids were used in place of asparagin the yield was 12 to 18 micrograms of riboflavin per ml. of medium.

EXAMPLE 2

A medium was prepared consisting of:

Glucose (cerelose) _____ gm__ 50
Corn steep water solids_____ gm__ 4
Ammonium sulfate_____ gm__ 2
Water _____ cc__ 1000
pH _____ 4.5

Twenty-five cubic centimeter portions were inoculated with *Mycocandida riboflavina* and incubated at 30° C. for 3 days. The yield of riboflavin was 12 to 18 micrograms per ml.

Under the same conditions, except that the flasks were agitated continuously, the yields of riboflavin were 30 to 45 micrograms per ml. of medium.

EXAMPLE 3

A mash was prepared consisting of:

Corn steep water solids_____ gm__ 4
Ammonium sulfate_____ gm__ 2
Sugar (as cane molasses)_____ gm__ 2
Water _____ cc__ 1000
pH _____ 4.5

Twenty-five cubic centimeter portions were inoculated with a suspension of *Mycocandida riboflavina* and incubated at 30° C. for 7 days. The yield of riboflavin was 4.5 to 7 micrograms per ml. of medium.

EXAMPLE 4

A mash was prepared consisting of 800 gm. corn steep water solids, 500 gm. sugar (0.67 kg. molasses), 360 gm. ammonium sulfate and 100 liters of water. The pH was adjusted to 4.45. The mash was sterilized by boiling for 15–20 minutes, cooled to 30°, inoculated with *Mycocandida riboflavina* and aerated continuously. After 24 hours, when the nutrients were nearly exhausted and a good culture had developed, additional nutrients were added at intervals in the form of cane molasses and the yields of cellular material and riboflavin were determined. The results are presented in the following table.

| Age of Culture | Av. pH | Total Sugar used (as molasses) | Total Cellular Material | Riboflavin, gamma per cc. |
|---|---|---|---|---|
| Hours | | Gm. | Gm. | |
| 24 | 3.97 | 500 | 291 | 1.3 |
| 30 | 3.34 | 800 | 478 | 1.8 |
| 33 | 2.99 | 1,200 | 601 | 3.1 |
| 36 | 2.71 | 2,000 | 770 | 4.6 |
| 40 | 2.51 | 3,200 | 902 | 6.8 |
| 46[1] | 5.53 | | | 12.1 |
| 52 | | | | 20.7 |
| 59 | | | | 30.0 |
| 65 | | | | 39.3 |
| 71 | 2.92 | 6,720 | 1,591 | 45.7 |
| 77 | | 7,725 | | 60.0 |

[1] 200 cc. of ammonia were added after 46 hours as nutrient and to adjust the pH (5.53).

The above values for riboflavin are for filtered mash. The cells, which had been removed, would contain additional vitamins.

EXAMPLE 5

The fermented mash from a fermentation identical to that of Example 4 was passed through a separator to concentrate the cells in a slurry amounting to 16 liters or a suspension of approximately 5% cells (dry basis). Ammonium hydroxide was added to bring the pH to 4.0. The suspension was aerated vigorously at 30° C. and 10 grams of glucose (cerelose) per liter were added every 6 hours. In 24 hours the filtered mash contained 145 micrograms of riboflavin per ml. and in 44 hours it contained 235 micrograms of riboflavin per ml.

The ammonia used to adjust the pH, together with a minimum amount of nutrients in the slurry, furnished sufficient nutrients so that the addition of sugar alone enabled the yeast to maintain itself in a predominantly metabolism phase during which a large amount of riboflavin was produced. The addition of the sugar in dry form served to obviate further dilution of the mash, resulting in a high concentration of vitamins in the liquid.

EXAMPLE 6

Commercial quantities of *Mycocandida riboflavina* and vitamins were obtained by using a commercial size (7,000 gallon) fermenter. The starting mash amounted to 3500 gallons containing 30 pounds corn steep water solids, 38 pounds of ammonia ($NH_3$) and 13.5 pounds phosphate calculated as $P_2O_5$ in steep water. The pH was adjusted to 4.4 by the addition of sulfuric acid. This starting mash was inoculated with 25 pounds (dry basis) of a 96 hour culture of *Mycocandida riboflavina*. The temperature was maintained at about 30° C. and the mash was aerated continuously. Over a period of 24 hours 3200 gallons of mash were introduced into the growing culture. This feeding mash contained 4,200 pounds of cane molasses. The pH was maintained between 3 and 4.5 by the addition of ammonium hydroxide. At the end of 24 hours 1000 pounds of yeast-like cellular material (dry solids basis) had been produced. The filtered mash contained 18.1 micrograms of riboflavin per ml. This procedure was primarily a growth or cell production process.

The mash from the above fermentation was passed through a separator to form a heavy cellular suspension which was then diluted to 3,000 gallons to form a suspension of 4% (on dry basis). While maintaining a temperature of about 30° C., a pH of about 3 to 4.5, and continuous aeration, sugar was added in the form of cane molasses. The amount and rate of addition of sugar was 10 grams per liter every 6 hours. At the end of 48 hours the increase in cells was comparatively small, amounting to 358 pounds, but the riboflavin produced during this metabolism phase amounted to 224 micrograms per ml. of filtered mash. A total of 2400 pounds of sugar were consumed and a yield of 2.92 kilos of riboflavin were contained in the filtered medium.

All of this cellular material was then passed through a second metabolism cycle and thereafter through a third cycle, under conditions described above for the first cycle. The initial riboflavin in the filtered and then diluted cells and mashes, before the addition of sugar, and the final yields in micrograms of riboflavin per ml. were as follows:

| Cycle | Initial | Final |
|---|---|---|
| 1 | 10.2 | 234.5 |
| 2 | 22.5 | 200.0 |
| 3 | 40.4 | 236.0 |

A total of 9.8 kilos of riboflavin were produced and excreted into the fluid medium in the three metabolism cycles described above. The amount of sugar fermented was 8,400 pounds, or the equivalent of 1.2 grams of riboflavin per pound of molasses sugar used. In addition, 2,500 pounds of yeast-like cellular material were recovered. The fluid portion was concentrated to a syrup containing 40% solids. This had a potency of 9,600 micrograms of riboflavin and 10 micrograms of pyridoxine per gram of solids.

EXAMPLE 7

In a fermentation similar to Example 5 the sugar was added to the yeast at a rate of 0.75 gram per liter per hour. After 24 hours the filtered liquor contained 70 micrograms of riboflavin per ml., or the equivalent of 1.75 grams of riboflavin per pound of sugar consumed.

EXAMPLE 8

Concentrates of high potency may be obtained by the concentration of the filtered mash of operations described in Example 6. A product of greater potency was obtained by removing part of the dissolved solids in the following manner. A concentrate containing 54% solids and 2,742 micrograms of riboflavin per ml. was treated with 1.5 volumes of 95% ethyl alcohol. The precipitate which formed was filtered out and the alcohol removed by evaporation in vacuo. The riboflavin content of the syrup thus obtained typical procedure and analysis to produce this was approximately 1.0% on the solids basis. A syrup was as follows:

Volume of original concentrate _____ 3.0 liters
Volume of alcohol added _____ 4.5 liters
Weight of dried precipitate ____ 938 gm.
pH of filtrate _____ 4.6
Riboflavin in filtrate (per ml.) _____ 1240 gamma
Riboflavin in total filtrate _____ $7.68 \times 10^6$ gamma
Riboflavin in original concentrate _____ $8.226 \times 10^6$ gamma
Percent of riboflavin in filtrate. 93.4
Solids in filtrate (per cc.) ____ 0.131 gm.
Riboflavin in solids of filtrate_ 0.946%

Both the precipitate and the partially refined high potency concentrate were valuable as adjuncts for foods and animal feeds.

EXAMPLE 9

A fermentation was conducted according to the procedure of Example 6 except that the feeding mash contained corn sugar. This served to reduce the total solids in the fermented liquor, resulting in a concentrate from which a heavy sludge separated. The potency of this concentrate was 5,550 gamma per cc., while the potency of the fluid only was 3,470 gamma of riboflavin per cc. Pure riboflavin was prepared from this sludge in the following manner: 400 cc. of sludge was centrifuged and the supernatant liquid poured off. The residue was washed several times with water. The final residue was suspended in a solvent consisting of 50 cc. of 50% ethyl alcohol, heated to effect solution, and riboflavin then allowed to crystallize. The crystals obtained melted at 268 to 273° C. The 400 cc. of sludge contained 3,600,000 micrograms or 3.6 grams of riboflavin. From the above procedure 2.0 grams of crystals were recovered, or a yield of 55.5%. This inexpensive method produced relatively pure riboflavin. All washings and liquors were saved since they contained varying amounts of this vitamin.

EXAMPLE 10

Cellular material was produced similar to the process of Example 6, then washed with water and suspended in water to make a 10% suspension. This suspension was aerated moderately and the pH maintained between about 5.0 to 6.8 by means of sulfuric acid. At the beginning of the aeration the riboflavin in the fluid part of the suspension was 10 gamma per cc. of filtrate. After six hours of aeration the fluid part of the filtered suspension contained 92 gamma per cc. of filtrate. The excretion of riboflavin into the aqueous medium was in part the result of metabolism within the cells, synthesizing additional vitamin or changing precursors to the excreted riboflavin.

Sugar was then added to the above suspension as in the metabolism phase of Example 6. There was an increase in riboflavin to 132 gamma per cc. of filtrate. The suspension as such was dried, yielding a cellular yeast-like dry product with a riboflavin content of 850 gamma per gram.

Products of varying potency may be obtained by the process described. The values given were obtained by means of a photofluorometer, thus representing values of riboflavin alone or of riboflavin and its precursors. The cellular *Mycocandida riboflavina* may be separated from the fermented mash and dried. The fermented liquid alone may be concentrated to a syrup of high potency or dried completely. Or, the fermented mash consisting of both yeast-like cells and vitamin-containing liquid may be concentrated or dried. By extracting these products with suitable solvents concentrates of any potency or even pure riboflavin may be obtained.

Cells produced during a growth cycle or process will contain lower amounts of vitamins while cells recovered from metabolism cycles will contain greater amounts. A composite of cells from both growth and metabolism cycles had the following potency:

| | Micrograms per gram |
|---|---|
| Riboflavin | 100 |
| Thiamin | 15 |
| Pyridoxine | 35 |
| Niacin | 200 |
| Pantothenic acid | 100 |

Biological tests with rats showed that the cellular material was adequate in all factors of the B complex vitamins.

While a temperature of 30° C. is indicated in the examples, a practical range of temperatures is from 25 to 35° C. Substantial yields of vitamins may be realized over a pH range of 2.0 to 7.0.

When the process is conducted so that most of the riboflavin or vitamins are produced during the metabolism phase or cycle, it is desirable to add the nutrients or carbohydrate in the form of a concentrated solution or as dry material so that the amount of riboflavin or vitamins in the fermented liquid will be relatively high. Thus it is unnecessary to evaporate excessive amounts of water in the preparation of concentrates or dry vitamin-containing products. It is also desirable that the cells be maintained in an active condition by supplying enough nitrogen to result in a protein content of about 40 to 50% and phosphate (or $P_2O_5$) of about 3 to 6%. The most efficient synthesis of riboflavin occurs with a relatively low concentration of carbohydrate preferably not over 1%.

What I claim is:

1. A process for producing riboflavin comprising the fermentation of a nutrient mash with *Mycocandida riboflavina* under aerobic conditions.

2. A process as in claim 1, in which the pH is maintained between 2.0 and 7.0 and the temperature is maintained between 25 and 35° C.

3. A process for producing riboflavin which comprises adding a culture of *Mycocandida riboflavina* to a sterilized nutrient mash, maintaining the temperature from about 25 to 35° C., regulating the pH between about 2.0 to 7.0, aerating the mash, to produce a large yield of cells, thereafter adding a carbohydrate-containing nutrient medium over an extended period of time with aeration for the production of vitamins, discontinuing the addition of carbohydrate-containing nutrient medium, allowing the fermentation to go to completion, thereafter recovering the cellular material and concentrating the liquid for the riboflavin contained therein.

4. A process for producing vitamins of the B complex which comprises culturing *Mycocandida riboflavina* in a nutrient medium, to obtain large quantities of cells, separating the cells to obtain a heavy suspension of cellular material for a metabolism cycle in which nutrient substances are supplied in minimum amounts, the carbohydrate not exceeding about 1%.

5. A process for producing riboflavin which comprises adding a culture of *Mycocandida riboflavina* to a nutrient mash, maintaining the temperature from about 25° to 35° C., regulating the pH between 2.0 and 7.0, aerating the mash to produce a large yield of cellular material, thereafter separating and washing the cellular material, suspending the cellular material in water, aerating the suspended cellular material at a pH between 2.0 and 7.0 at a temperature from about 25° to 30° C. to permit the intracellular formation of riboflavin and excretion of riboflavin into the aqueous medium.

6. A process for producing riboflavin which comprises adding a culture to a nutrient medium, continuing the culturing to obtain a large quantity of cellular material, separating and washing the cellular material, suspending the cellular material in water to permit the intracellular formation of riboflavin and thereafter adding to the aqueous suspension a fermentable carbohydrate to maintain a metabolism cycle for increased riboflavin production.

7. A process for producing riboflavin which comprises adding a culture of *Mycocandida riboflavina* to a nutrient mash, maintaining the temperature from 25° to 35° C., regulating the pH between 2.0 and 7.0, aerating the mash to produce a large yield of cellular material, thereafter separating and preferably washing the cellular material, suspending the cellular material in water, aerating the suspended cellular material at a pH between 2.0 and 7.0 at a temperature from about 25° to 30° C. to permit the intracellular formation of riboflavin and excretion of riboflavin into the aqueous medium and thereafter adding a fermentable carbohydrate to the aqueous suspension of cellular material to maintain a metabolism cycle for increased riboflavin formation.

8. A process for producing yeast and vitamins of the B complex, which comprises adding a culture of *Mycocandida riboflavina* to a sterile nutrient mash, regulating the temperature within the range of 25° to 35° C., maintaining the pH within a range of 2.0 to 7.0, feeding a nutrient mash containing a carbohydrate, a source of yeast growth factors, ammonium sulphate and ammonia and ammonium phosphate, as required to maintain active growth of the yeast, the mash having a carbohydrate content of 5 to 10% utilizable sugar and sufficient nutrients to maintain optimum growth, continuing the feeding until the concentration of yeast reaches a level of 2 to 5 parts per hundred dry substance, and a riboflavin content of 50 to 300, thereafter recovering the yeast and riboflavin-rich medium.

9. A process for producing yeast and vitamins of the B complex, which comprises adding a culture of *Mycocandida riboflavina* to a sterile nutrient mash, regulating the temperature within the range of 25° to 35° C., maintaining the pH within a range of 2.0 to 7.0, feeding a nutrient mash containing a carbohydrate, a source of yeast growth factors, ammonium sulphate and ammonia and ammonium phosphate, as required to maintain active growth of the yeast, the mash having a carbohydrate content of 5 to 10% utilizable sugar and sufficient nutrients to maintain optimum growth, continuing the feeding until the concentration of yeast reaches a level of 2 to 5 parts per hundred dry substance, and a riboflavin content of 50 to 300, thereafter maintaining the feed and at the same time recovering yeast and vitamin-rich liquor in a continuous process.

10. A process as described in claim 8, followed by a concentration of the yeast cells to a level of 5 to 10 parts per 100, addition of nutrients containing carbohydrates at a low level, not in excess of 1% sugar, aerating the culture until riboflavin production stops, restoring the level and continuing aeration over a like period of time, normally 4 to 6 hours, continuing the process until riboflavin reaches a level of 200 to 250 micrograms per milliliter, after which the yeast is recovered and the cycle repeated.

11. A process for producing riboflavin which comprises culturing *Mycocandida riboflavina* under aerobic conditions in the temperature range of 25–32° C. in a medium consisting essentially of a soluble utilizable carbohydrate nutrient, a mixture of mineral nutrients and a source of biotin, separating the yeast after a suitable interval of time, resuspending the yeast in a fresh medium under aerating conditions to produce further quantities of riboflavin, the yeast then being separable for repeated culturing in fresh medium for the production of riboflavin.

12. A process for producing riboflavin which comprises adding a culture of *Mycocandida riboflavina* to a sterilized nutrient mash, consisting essentially of utilizable carbohydrate, mineral nutrients, and a source of biotin, maintaining the temperature in the range of 25–35° C., regulating the pH between 2.0 and 7.0, aerating the mash, to produce a large yield of cells, thereafter

Certificate of Correction

Patent No. 2,537,148                                January 9, 1951

JOSEPH E. McCLARY

It is hereby certified that error appears in the printed specification of the above numbered patent requiring correction as follows:

Column 7, lines 42 and 43, for the words "typical procedure and analysis to produce this was approximately 1.0% on the solids basis. A" read *was approximately 1.0% on the solids basis. A typical procedure and analysis to produce this*;

and that the said Letters Patent should be read as corrected above, so that the same may conform to the record of the case in the Patent Office.

Signed and sealed this 13th day of March, A. D. 1951.

[SEAL]

THOMAS F. MURPHY,
*Assistant Commissioner of Patents.*